United States Patent

Wilk

[11] Patent Number: 6,055,212
[45] Date of Patent: Apr. 25, 2000

[54] ULTRASONIC IMAGING SYSTEM AND ASSOCIATED METHOD

[76] Inventor: Peter J. Wilk, 185 W. End Ave., New York, N.Y. 10023

[21] Appl. No.: 09/112,487

[22] Filed: Jul. 9, 1998

[51] Int. Cl.[7] .................................................. G01S 15/88
[52] U.S. Cl. ............................................. 367/68; 367/88
[58] Field of Search ............................... 367/68, 38, 88; 324/338, 326

[56] References Cited

U.S. PATENT DOCUMENTS

| | | | |
|---|---|---|---|
| 4,319,347 | 3/1982 | Savit | 367/52 |
| 4,403,311 | 9/1983 | Tournois | 367/11 |
| 4,719,426 | 1/1988 | Weiss | 324/345 |
| 5,025,423 | 6/1991 | Earp | 367/137 |
| 5,136,550 | 8/1992 | Chambers | 367/38 |
| 5,184,330 | 2/1993 | Adams et al. | 367/111 |
| 5,471,435 | 11/1995 | Marschall | 367/135 |
| 5,617,031 | 4/1997 | Tuttle | 324/326 |
| 5,671,136 | 9/1997 | Willhoit, Jr. | 364/421 |
| 5,930,199 | 6/1999 | Wilk | 367/88 |
| 6,002,644 | 12/1999 | Wilk | 367/88 |

Primary Examiner—Christine K. Oda
Assistant Examiner—Victor J. Taylor
Attorney, Agent, or Firm—R. Neil Sudol; Henry D. Coleman

[57] ABSTRACT

A system for underground surveying includes a plurality of substantially rigid frames and a plurality of acoustoelectric sensors for generating electrical signals encoding echo responses of underground surfaces. Each of the frames carries at least one of the sensors, the sensors being disposable in effective physical contact with underground structures upon an insertion of the frames through a ground surface. An acoustic energy generator is disposed on at least one of the frames, while position determination componentry is operatively connected to the sensors for determining locations of the sensors relative to one another. An electronic signal processor is operatively connected to the sensors for analyzing the electrical signals in accordance with the determined locations of the sensors to determine surfaces of an object hidden underground and for generating a video signal encoding an image of the object. A video monitor is operatively connected to the processor for displaying the image of the object.

23 Claims, 6 Drawing Sheets

ULTRASONIC IMAGING SYSTEM AND ASSOCIATED METHOD

BACKGROUND OF THE INVENTION

This invention relates to an imaging system utilizing ultrasonic waves for sensing purposes. More particularly, this invention relates to such a system for use in detecting and surveying underground surfaces. This invention also relates to an associated method.

Treasure hunters' first and sometimes primary chore is determining the locations of valuable artifacts. A considerable number of artifacts of interest to archeologists and/or paleontologists remain underground. These artifacts are detected only with considered trial and error, if not happenstance.

OBJECTS OF THE INVENTION

An object of the present invention is to provide an imaging system which facilitates detection of objects underground.

An associated object of the present invention is to provide such imaging system which facilitates identification of objects which are located underground.

It is a more specific object of the present invention to provide such an imaging system capable of detecting objects inside other objects which are underground.

A further object of the present invention is to provide an associated imaging method enabling the visual inspection of underground objects.

These and other objects of the present invention will be apparent from the drawings and descriptions herein.

SUMMARY OF THE INVENTION

A system for underground surveying comprises a plurality of substantially rigid frames and a plurality of acoustoelectric sensors for generating electrical signals encoding echo responses of underground surfaces. Each of the frames carries at least one of the sensors, the sensors being disposable in effective physical contact with underground structures upon an insertion of the frames through a ground surface. An acoustic energy generator is disposable in effective physical contact (pressure-wave-transmitting contact) with the underground structures, while position determination componentry is operatively connected to the sensors tor determining locations of the sensors relative to one another. An electronic signal processor is operatively connected to the sensors for analyzing the electrical signals in accordance with the determined locations of the sensors to determine surfaces of an object hidden underground and for generating a video signal encoding an image of the object. A video monitor is operatively connected to the processor for displaying the image of the object.

The acoustic energy or pressure wave generator may be an electroacoustic transducer. In that case, the system further comprises an a-c current generator operatively connected to the electroacoustic transducer for energizing the electroacoustic transducer with an electrical signal of a pre-established frequency, preferably an ultrasonic frequency. This embodiment of the invention is particularly useful where the ground formation or underground structures are wet. Wet ground formations naturally occur in marshlands, clay deposits and below the water table and may be induced by injecting water into a dry ground structure. Alternatively, the acoustic energy or pressure waves transmitted through the underground structures may be generated by an explosive device.

In accordance with another feature of the present invention, the processor includes an analyzer operatively connected to the acoustoelectric sensors for determining a three-dimensional shape of the object by analyzing signals generated by the acoustoelectric sensors in response to pressure waves produced at the object in response to pressure waves produced by the acoustic energy generator.

In accordance with a further feature of the present invention, the processor includes a view selector operatively connected to the video monitor for selecting the image from among a multiplicity of possible images of the object. The object on the video screen may thus be inspected from different angles or at different degrees of magnification. A filter stage may be operatively connected to the processor and the video monitor for eliminating a selected surface from the image. This feature enables a user to view, on the monitor, an image of surfaces buried beneath other surfaces or of an object inside another object. For example, if a chest or urn contains other artifacts, those artifacts may be visually inspected without digging up the chest or urn.

Preferably, circuitry is provided for sampling or receiving the electrical outputs of the acoustoelectric sensors in a predetermined sequence.

The position determination componentry may include an additional processor for analyzing additional electrical signals generated by the sensors in response to pressure waves transmitted underground directly from the acoustic energy generator to the acoustoelectric sensors.

A method for underground surveying comprises, in accordance with the present invention, disposing an array of acoustoelectric sensors in operative contact with a ground formation capable of transmitting pressure waves, thereafter determining physical locations of the acoustoelectric sensors relative to each other and generating a pressure wave in the ground formation, subsequently energizing the acoustoelectric sensors to generate a series of electrical signals encoding echo responses of underground surfaces to the pressure wave, automatically analyzing the electrical signals to generate a video signal encoding an image of the surfaces, and feeding the video signal to a video monitor to thereby display the surfaces on the monitor.

Where the sensors are mounted to a plurality of substantially rigid frame members, the disposing of the sensor array includes inserting the frames through a ground surface and into the ground formation. Where the frame members each have an elongate dimension, the disposing of the sensor array includes disposing the frame members so that the respective elongate dimensions extend approximately parallel to a gravity vector or at an acute angle with respect to the gravity vector.

Where the sensors are mounted to a carrier such as a fluid filled container, the disposing of the sensor array includes disposing the container on the ground formation. The container may have a wedge shape with a first wall and a second wall disposed at an angle relative to one another. The sensors are fixed to the second wall. In that case, the disposing of the sensor array includes disposing the first wall in contact with the formation and the second wall at the angle with respect to the first wall. The container may be disposed in an arcuate configuration, e.g., a circle or a regular polygon, on the formation.

In order to facilitate the conduction of ultrasonic pressure waves through the ground formation, a liquid such as water may be introduced into the formation. This step is generally of special advantage where the ground formation is made of a dry material. In some cases, for example, in marshlands, bogs, swamps, and clay deposits, the introduction into the ground formation of a liquid such as water may be superfluous.

The energizing of the acoustoelectric sensors preferably includes receiving signals from the sensors in a predetermined sequence. Determining the physical locations of the sensors includes analyzing additional electrical signals generated by the sensors in response to pressure waves transmitted through the formation directly from an acoustic wave generator to the sensors.

In accordance with additional features of the present invention, (1) the analyzing of the electrical signals may include analyzing the electrical signals to determine a three-dimensional shape of an object defined by at least one of the surfaces, (2) the image may be selected from among a multiplicity of possible images of the surfaces, with a different image being subsequently selected from among the possible images and displayed on the monitor, and (3) at least a portion of a selected object may be eliminated from the image to thereby show on the monitor an image of an object behind the eliminated portion of the selected object.

A plurality of pressure wave generators may be disposed in a predetermined configuration. In that case, the generators are operated in a predetermined sequence.

An imaging system in accordance with the present invention facilitates detection of objects underground. The imaging system is capable of detecting objects inside other objects which are underground.

DESCRIPTION OF THE PREFERRED EMBODIMENTS

Figure 1:
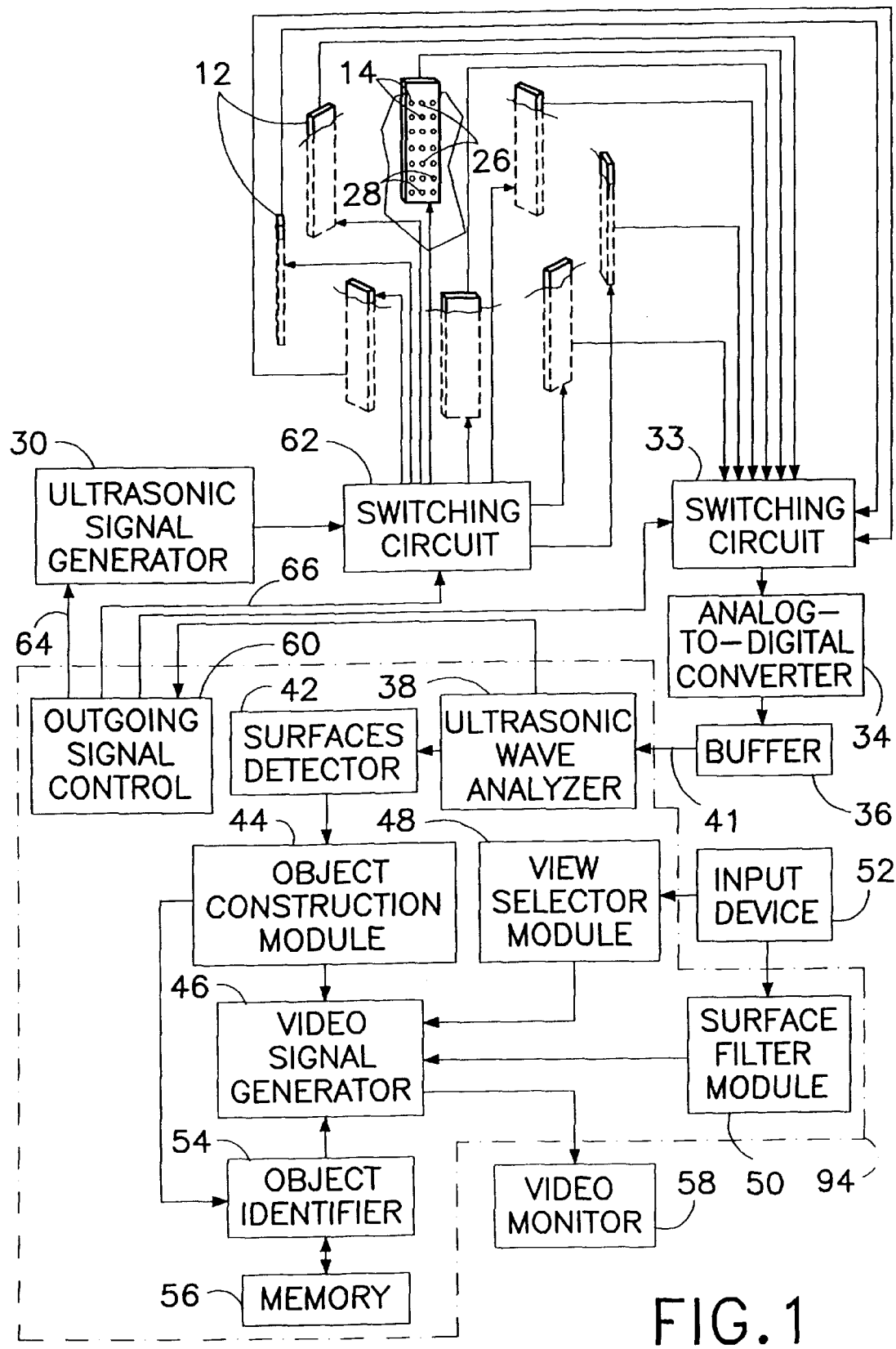
FIG. 1 is partially a schematic perspective view, partly broken away, and partially a block diagram of an ultrasonic system for underground surveying, in accordance with the present invention, showing a plurality of transducer carriers or frames.

As illustrated in FIG. 1, a system for underground surveying comprises a plurality of substantially rigid frames 12 each carrying a plurality of electromechanical transducers 14 for generating electrical signals encoding ultrasonic echo responses of underground surfaces, for example, a lid surface 16 (see FIG. 2) and a body surface 18 of an object UO buried underground. Object UO might, for example, be a chest or an urn containing valuable archeological objects.

Figure 2:
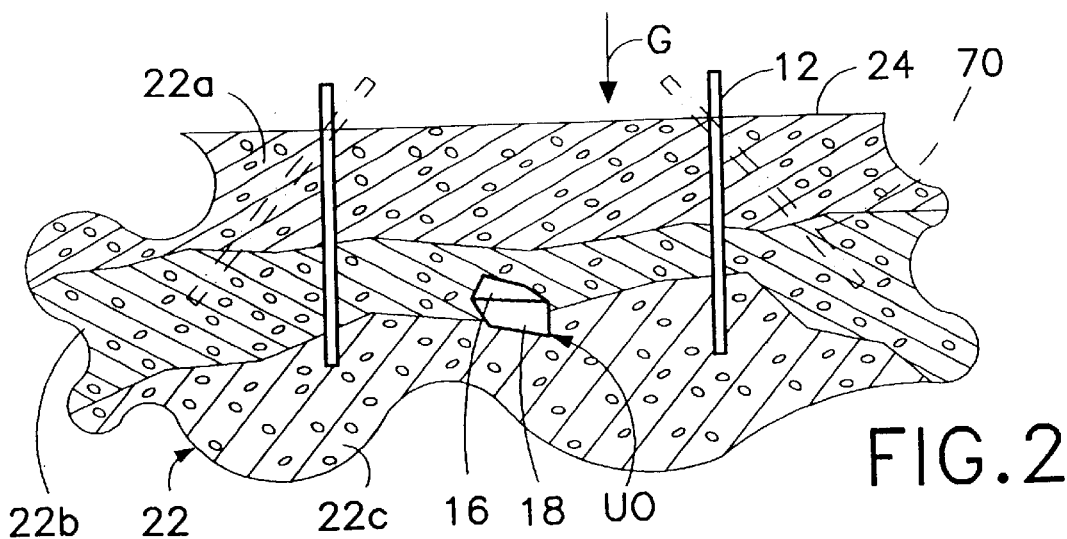
FIG. 2 is a schematic side elevational view of the system of FIG. 1, showing a modification in use of the system.

Each frame 12 carries at least one ultrasonic transducer 14. Upon an insertion of the frames through a ground surface 24, transducers 14 are disposed in physical contact with underground structures 22 capable of transmitting ultrasonic pressure waves. As illustrated in FIG. 2, the underground structures 22 may include a plurality of geologic layers 22a, 22b and 22c each capable of transmitting ultrasonic pressure waves. In most cases, the material of the underground structures incorporates significant quantities of water. Thus, the underground mass may be a clay deposit, a marsh or a water-filled porous land mass. The water may be present naturally or supplied to the land mass in order to carry out the ultrasonic sensing techniques described herein.

Transducers 14 include one or more electroacoustic transducers 26 and one or more acoustoelectric sensors 28. Frames 12, with the electromechanical transducers 14 thereon, are deployable underground so that the transducers are disposed in an array which has at least two dimensions. An a-c current or ultrasonic signal generator 30 is operatively connected to electroacoustic transducers 26 for energizing the electroacoustic transducers with electrical signals of one or more pre-established ultrasonic frequencies. So energized, the electroacoustic transducers 26 produce ultrasonic pressure waves in the underground formations or structures 22 in which the respective frames or carriers 12 are disposed.

Figure 3:
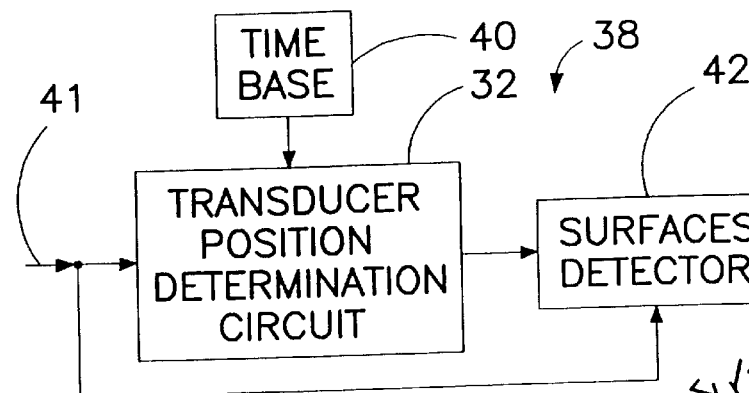
FIG. 3 is a block diagram showing selected components of a wave analyzer and a surface detector module shown in FIG. 1.

In order to make use of the ultrasonic signal information obtained by sensors or electromagnetic transducers 14, the relative positions of the sensors must be known. Pursuant to one methodology, frames 12 are deployed at predetermined positions and at pre-established angles relative to ground surface 24. Accordingly, because the locations of the transducers 14 on frames 12 are known, the underground locations of the sensors relative to one another will be known. Alternatively, a position determination circuit 32 (FIG. 3) is operatively connected to sensors or electromechanical transducers 14 for determining locations of the sensors relative to one another.

After being reflected or echoed by underground surfaces, where there is a change in the rate of transmission or conduction of the pressure waves, the pressure waves are detected by acoustoelectric sensors 28. Sensors 28 generate electrical signals having frequencies corresponding to those of the incoming pressure waves. The electrical signals are transmitted via a multiplexer or switching circuit 33 to an analog-to-digital converter 34 into digital signals which are temporarily stored in a buffer 36 for timely analysis by a preliminary signal processing circuit or ultrasonic wave analyzer 38. Wave analyzer 38 includes position determination circuit 32 (FIG. 3) and a time base 40.

Circuit 32 receives, via a lead or multiple 41 extending from analog-to-digital converter 34 and buffer 36, electrical signals derived from incoming pressure waves. Circuit 32 separates out those signals corresponding to direct or unreflected ultrasonic pressure wave transmission paths to determine the relative locations of sensors or transducers 14 (both electroacoustic transducers 26 and acoustoelectric sensors 28). The encoded locations of transducers 14 are communicated by circuit 32 to a surfaces detector module 42. Module 42 analyzes incoming electrical signals from sensors 28 to determine and analytically define the surfaces of an underground object UO which generate reflected or echoed pressure waves in response to ultrasonic pressure waves from transducers 26. Time base 40 enables operation of circuit 32 and module 42.

As illustrated in FIG. 1, module 42 is connected at an output to an object construction module 44 which analyzes the surface information from module 42 to determine whether a collection of detected surfaces fit together to form an object. Module 44 thus determines the three-dimensional shapes of the underground object UO. Module 44 is connected at outputs to a video signal generator 46 which produces, from the object information from module 44, an image of underground object UO. The image is varied by generator 46 in accordance with instructions from a view selector module 48 and a surface filter module 50. In response to commands from an input device 52 such as a keyboard or a mouse, view selector 48 provides instructions to video signal generator 46 as to the angle and magnification of the image encoded in the video signal. In response to additional commands from input device 52, filter module 50 instructs video signal generator 46 to remove one or more surfaces from the image of underground object UO, thereby enabling the inclusion in the image of objects inside of or behind object UO.

Object construction module 44 is also connected at an output to an object identifier circuit 54 which consults a memory 56 in a pattern recognition or comparison operation to determine the identity or object type of underground object UO. If an identification is established, object identifier circuit 54 provides instructions to video signal generator for incorporating identification information into the video signal. The identification information may include words or symbols providing a name and known historical data pertaining to the class of objects into which object UO is determined to fall.

Generator 46 is connected to a video monitor 58 for displaying the view-selected and surface-filtered image of underground object UO, together with any ancillary information discovered by object identifier circuit 54.

Preliminary signal processing circuit or wave analyzer 38 is operatively connected to ac current or ultrasonic signal generator 30 via an outgoing signal control unit 60. Control unit 60 produces a control signal which determines, for example, the frequency of an outgoing ultrasonic pressure wave produced by electroacoustic transducers 26 and the identity of the particular electroacoustic transducer 28 generating that pressure wave. Signal generator 30 is a variable-frequency ultrasonic signal source and is connected to electroacoustic transducers 26 via a multiplexer or switching circuit 62. Signal generator 30 and switching circuit 62 receive control signals via respective leads 64 and 66 from control unit 60. Switching circuit 62 operates to connect signal generator 30 sequentially to different electroacoustic transducers 26. Typically, the energization sequence of transducers 26 is pre-established and determined in part by the specific configurations of transducers 26 and sensors 28 on frames 12.

Similarly, control unit 60 is connected to multiplexer or switching circuit 33 via a lead or multiple 68 for inducing that circuit to sequentially connect analog-to-digital converter 36 to different acoustoelectric sensors 28. The connection sequence of sensors 28 is also pre-established and determined in part by the specific configurations of transducers 26 and sensors 28 on frames 12.

In many cases, in order to facilitate the separation of incoming reflected signals originating at different electroacoustic transducers 26, these transducers are activated with signals of detectably different ultrasonic frequencies. The sequence of transducer activation and the frequency or frequencies of actuation are communicated by control unit 60 to surfaces detector module 42. Detector module 42 utilizes that information to properly analyze the arriving ultrasonic signals. In the event that the incoming data are insufficient for detector module 42 to isolate, calculate and define surfaces of underground object UO, the detector module may transmit a signal to control unit 60 to change the energization sequence of transducers 26 and/or the energization frequencies.

As illustrated in FIG. 2, frames 12 may be inserted into ground formations or underground structures 22 in substantial parallelism with a local gravity vector G or, alternatively, at an angle to that vector, as indicated in phantom lines 70.

Figure 4:
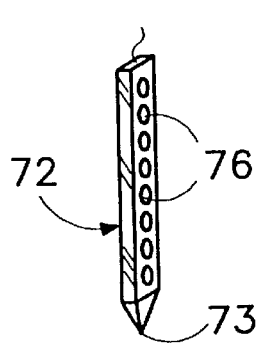
FIG. 4 is a schematic perspective view of a modified transducer carrier or frame.
Figure 5:
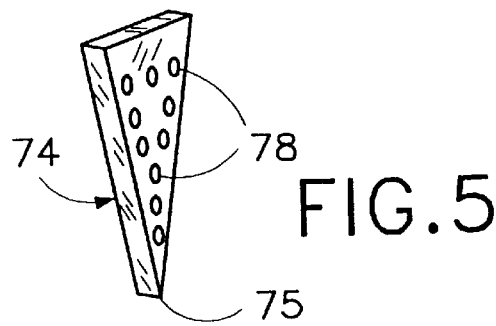
FIG. 5 is a schematic perspective view of another modified transducer carrier or frame.

FIGS. 4 and 5 depict alternative frames or transducer carriers 72 and 74. These alternative frames are provided with sharp end points 73 and 75 for facilitating the insertion of the frames through a ground surface (24 in FIG. 2). As described hereinabove with reference to FIG. 1, frames 72 and 74 carry electromechanical transducers 76 and 78 which include electroacoustic transducers (not separately designated) for generating outgoing pressure waves and acoustoelectric sensors (not individually labeled) for detecting incoming reflected or refracted pressure waves.

It is to be noted that the connections of transducers 26 and sensors 28 to switching circuits 62 and 33 may be implemented via wireless communications links or via wires.

Figure 6:
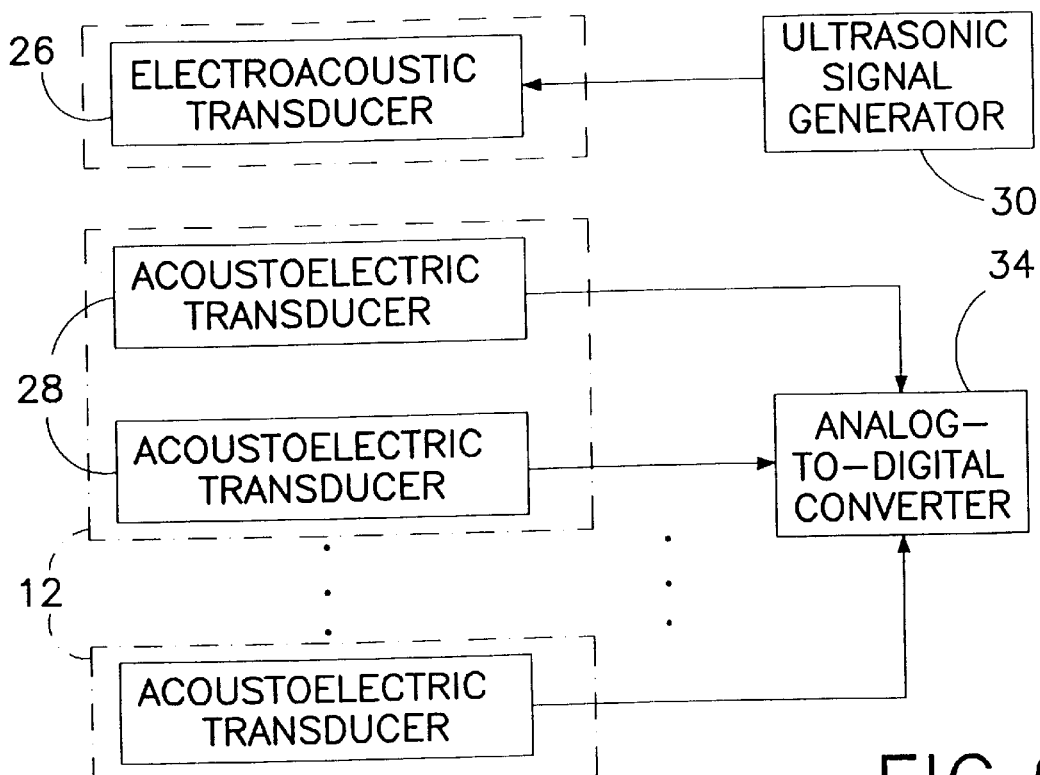
FIG. 6 is a block diagram showing a specific variant of the system of FIG. 1.

FIG. 6 shows a specific configuration of an underground-topography imaging system including just one electroacoustic transducer 26 and a multiplicity of acoustoelectric sensors 28. Here the enhancement of image resolution and optimization of surface detection and definition are accomplished mainly by varying the ultrasonic output frequency of the one electroacoustic transducer and the sequence of signal transmission from acoustoelectric sensors 28.

Figure 7:
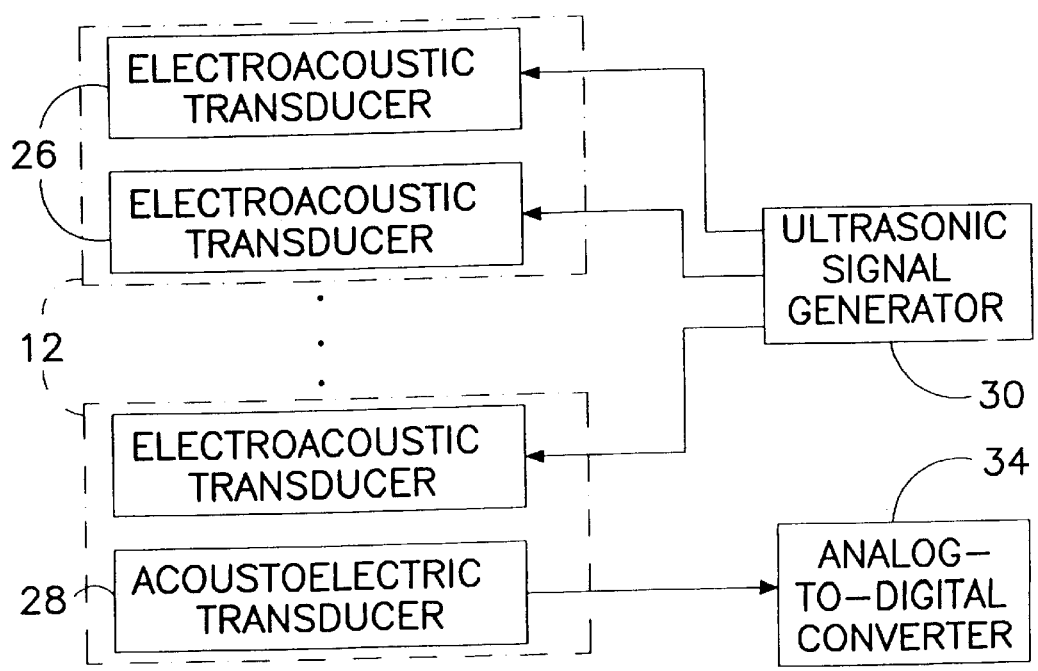
FIG. 7 is a block diagram showing another variant of the system of FIG. 1.

FIG. 7 depicts a particular configuration of another underground-topography imaging system including just multiple electroacoustic transducers 26 and a single acoustoelectric sensor or transducer 28. In this case, the enhancement of image resolution and optimization of surface detection and definition are accomplished by varying the ultrasonic output frequencies and the energization sequence of the electroacoustic transducers.

Figure 8:
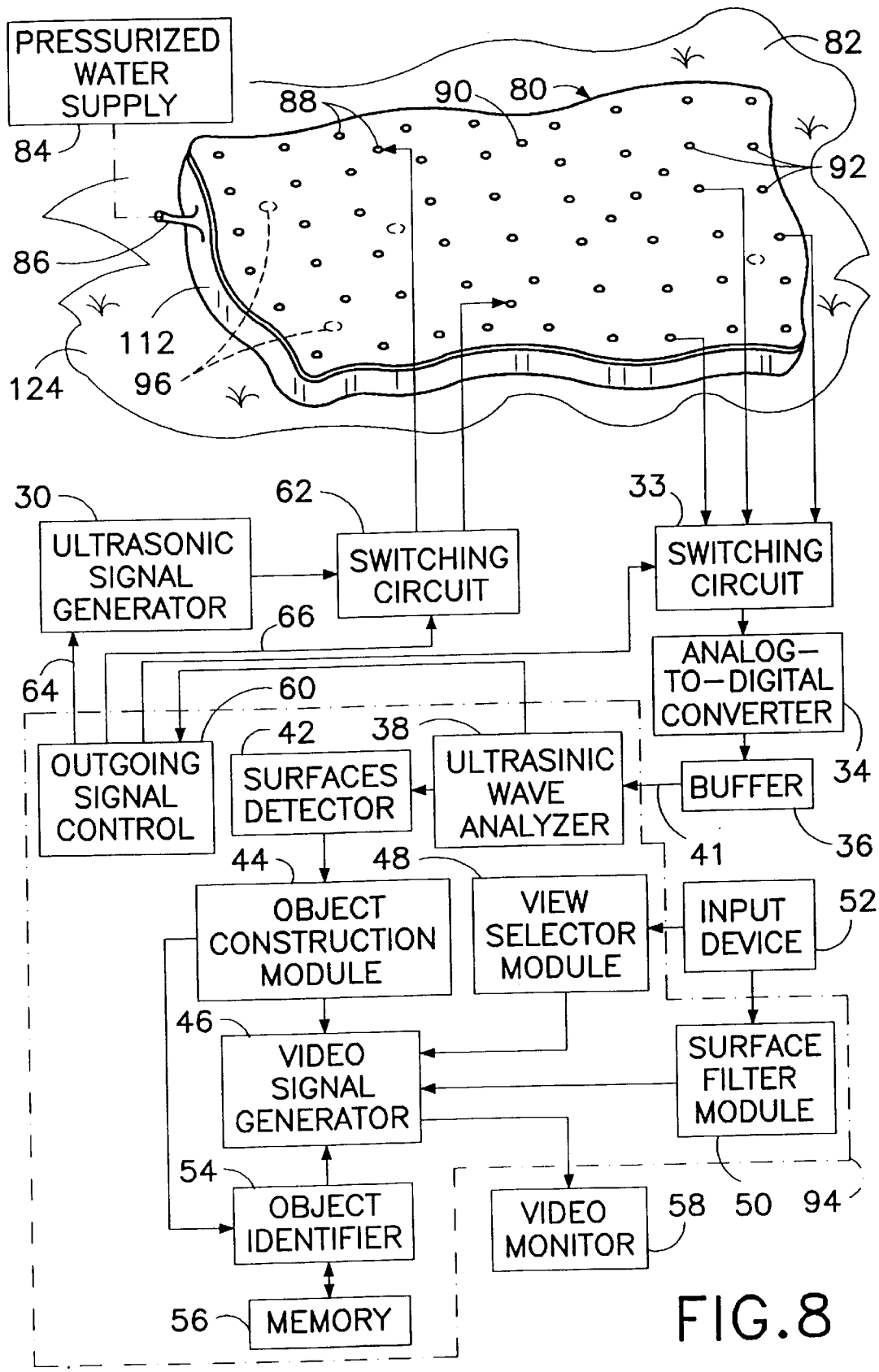
FIG. 8 is a schematic perspective view of a system for underground surveying, in accordance with the present invention.

As illustrated in FIG. 8, another system for conducting an underground survey comprises a liquid filled receptacle 80 disposable on a ground surface 82. Generally, the receptacle is disposed on the ground surface prior to being filled with liquid such as water from a supply 84. Supply 84 is connected to an inlet port 86 of receptacle 80. A valve (not shown) may be provided for regulating liquid flow to and from receptacle 80.

Receptacle 80 may take the form of a rubber or polymeric bag which may have a single internal chamber (not shown) or multiple internal chambers separated by partitions (not shown). Disposed on or inside receptacle 80 are a plurality of electromechanical transducers 88 including one or more electroacoustic transducers 90 and one or more acoustoelectric sensors 92. Electronic circuit functional block components of the embodiment of FIG. 8 are the same as in the embodiment of FIG. 1 and carry the same reference numerals. Thus, electroacoustic transducers 90 are operatively connected in a predetermined sequence to signal generator 30 via multiplexer or switching circuit 62 under the control of unit 60. Acoustoelectric sensors 92 are connected to wave analyzer 38 via switching circuit 33, analog-to-digital converter 34 and buffer 36. The digitized reflected pressure wave signals are processed by analyzer 38, surfaces detector module 42, object construction module 44, and object identifier 54 as discussed above with reference to FIG. 1. These circuit components, together with video signal generator 46, view selector module 48, filter module 50 and outgoing signal control unit 60, may be implemented as generic computer circuits modified by special purpose programming. Reference numeral 94 designate a computer.

As discussed above with reference to FIGS. 1 and 2, ground surface 82, as well as underlying subsurface structures (see FIG. 2), may be wetted to facilitate the conduction of ultrasonic pressure waves. To that end, receptacle 80 may be provided in a lower surface with apertures 96 for enabling the passage of liquid from the receptacle onto ground surface 82 and into the underlying subsurface structures. Of course, this technique will be applicable only if the underlying surfaces are capable of absorbing the liquid.

It is to be noted that the transducer-carrying frames 12 of FIGS. 1 and 2, as well as the receptacle 80 of FIG. 8, may be used where acoustic or pressure waves are generated by a source other than a transducer, for example, an explosive charge. To that end, a number of frames 12 in the embodiment of FIG. 1 may be provided with explosive charges. To compute effectively exact locations of the explosive charges relative to the acoustoelectric sensors 28 and of the acoustoelectric charges relative to each other, the explosive charges may be provided in pairs, with a first charge being detonated to enable automatic determination of the relative positions of the explosive charges and the acoustoelectric transducers. The second charge of each pair is then deployed in the same location as the respective detonated charge and subsequently detonated to generate acoustic or pressure waves of different frequencies in the underground structures or formations. The explosive charges used in this process are of substantially less power than the charges used in oil and seismic exploration inasmuch as the depths of underground searching for buried artifacts and other articles of manufacture are generally substantially less than the search depths for oil and gas deposits.

Figure 9:
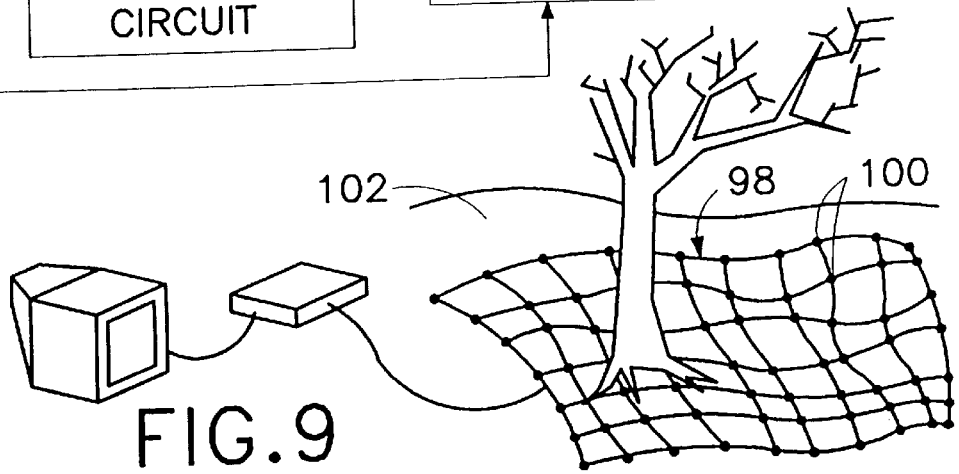
FIG. 9 is a schematic perspective view of another system for underground surveying, in accordance with the present invention.

FIG. 9 illustrates a frame or carrier in the form of a net 98 to which a plurality of electromechanical transducers 100 are attached. Transducers 100 include one or more acoustoelectric sensors (not separately designated) and optionally includes one or more electroacoustic transducers (not separately designated). Transducers 100 are adapted for placement in pressure-wave-transmitting contact with a ground surface 102. The exact design of the transducers depends on the type (frequency) of pressure waves being used in the surveying process. The type of pressure waves in turn depends in part on the nature of the underground structures or formations below surface 102 and on the nature of surface 102. Higher frequencies (e.g., ultrasonic) may be transmitted through wet land structures than through dry land structures (rock).

Figure 10:
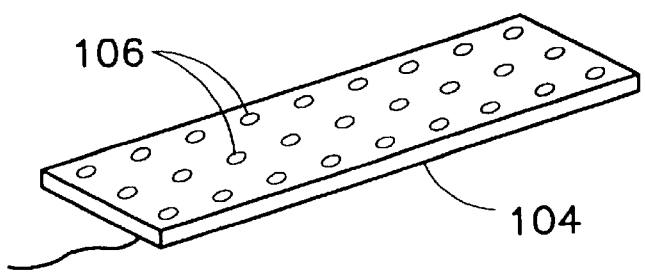
FIG. 10 is a schematic perspective view of a transducer pad utilizable in an underground surveying system in accordance with the present invention.
Figure 11:
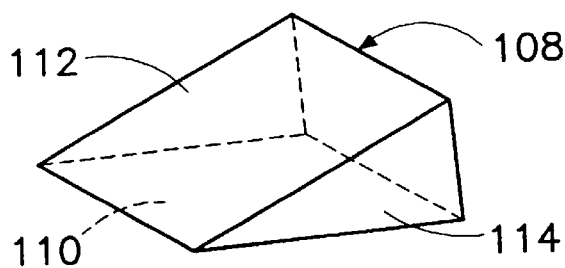
FIG. 11 is a schematic perspective view of an alternatively inflatable and collapsible frame member utilizable in an underground surveying system in accordance with the present invention.
Figure 12:
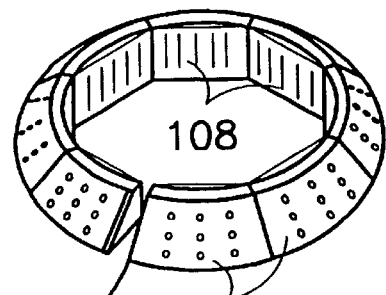
FIG. 12 is a schematic perspective view of an underground surveying system utilizing the elements of FIGS. 10 and 11.

FIG. 10 depicts a carrier pad 104 to which a plurality of electromechanical transducers 106 are attached, while FIG. 11 shows a wedge-shaped frame 108 having a lower wall 110 and an upper wall 112 disposed at an angle relative to one another. Frame 108 may be a balloon or container which is expandable into the illustrated configuration upon being filled via a port 114 with a liquid such as water. As shown in FIG. 12, a plurality of expanded frames 108 are disposed in a predetermined configuration such as a circle, with a plurality of pads 104 being disposed on the upper walls 112 of frames 108 in pressure-wave-transmitting contact therewith. Pads 104 are effectively part of upper walls 112.

Figure 13:
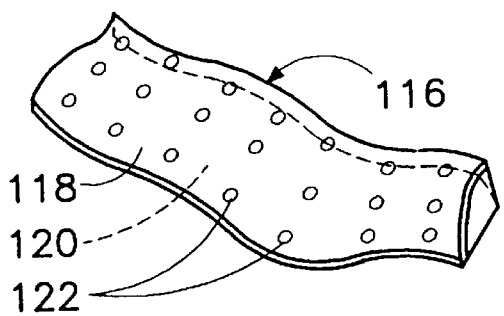
FIG. 13 is a schematic perspective view of another alternatively inflatable and collapsible frame member utilizable in an underground surveying system in accordance with the present invention, showing the frame member in a collapsed configuration.
Figure 14:
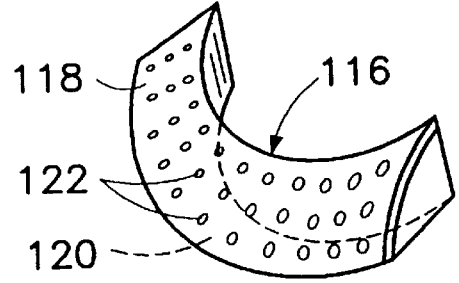
FIG. 14 is a view similar to FIG. 13, showing the frame member of in an expanded configuration.
Figure 15:
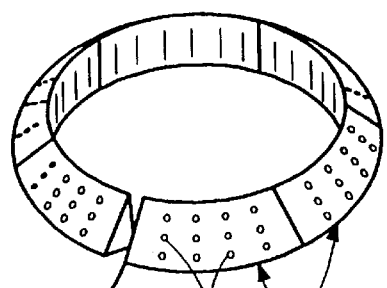
FIG. 15 is a schematic perspective view of an underground surveying system utilizing the elements of FIGS. 13 and 14.

In an alternative pressure-wave transmission assembly, a plurality of collapsible containers or balloons 116 (FIG. 13) each having an arcuate configuration in an expanded condition (FIG. 14) are placed side by side to form a circle (FIG. 15). Each container or balloon 116 has an upper wall 118 and a lower wall 120 oriented at a wedge angle to one another in the expanded condition of the respective balloon or container. Each container or balloon 116 is provided on upper wall 118 with a plurality of electromechanical transducers 122 in a pre-established array.

The underground surveying equipment of FIGS. 10–12 and FIGS. 13–15 are disposed at a site above buried treasure or other artifacts of value. The circular configurations are intended to surround the suspected site to facilitate the derivation or generation of reflected or echoed sonic or ultrasonic signals.

The underground surveying equipment of FIGS. 10–12 and FIGS. 13–15 may use ultrasonic pressure waves to detect underground objects and the surfaces of those objects, as discussed above with reference to FIGS. 1 and 8. Alternatively, the underground pressure waves may be generated by explosive devices. For example, an explosive device might be implanted below the surface within the circular configuration of FIG. 12 or 15.

Figure 16:
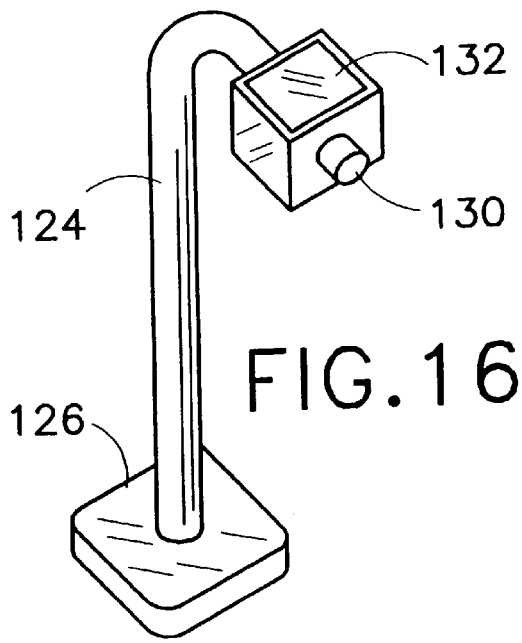
FIG. 16 is a schematic perspective view of a hand-held or hand-manipulable underground surveying device in accordance with the present invention.
Figure 19:
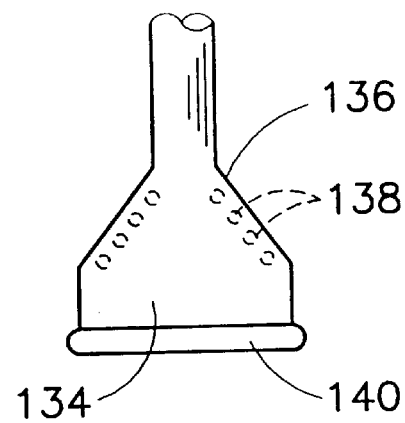
FIG. 19 is a partial elevational view of another modification of the transducer carrier component of FIGS. 16 and 17.
Figure 17:
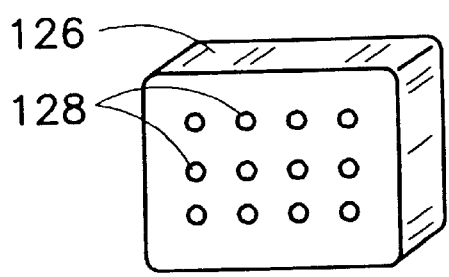
FIG. 17 is a schematic perspective bottom view of a transducer carrier component shown in FIG. 16.
Figure 18:
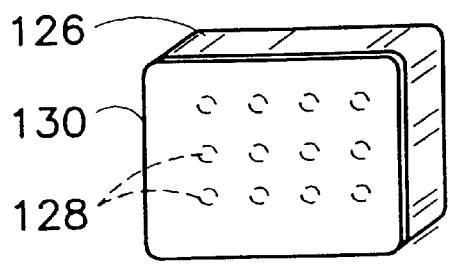
FIG. 18 is a schematic perspective bottom view showing a modification of the transducer carrier component of FIGS. 16 and 17.
Figure 20:
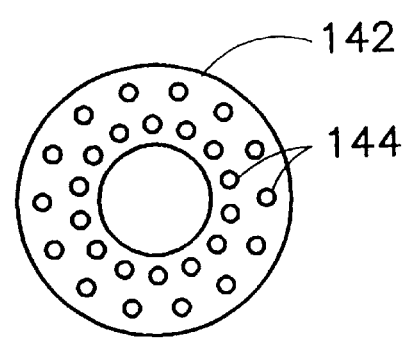
FIG. 20 is a partial elevational view of yet another modification of the transducer carrier component of FIGS. 16 and 17.

FIG. 16 illustrates a hand-held or hand-manipulable device for conducting underground searches. A shaft 124 is provided at a lower end with a frame 126 carrying an array of electromechanical pressure-wave transducers 128 (FIG. 17). As shown in FIG. 18, a flexible pad 130 filled with water or other liquid is attachable to the bottom side of frame 126 for enhancing the conduction of pressure waves to and/or from transducers 128. At an upper end, shaft 124 is provided with a handle 130 and a video display 132. Alternative configurations of frame 126 are illustrated in FIGS. 19 and 20. In FIG. 19, a frame or transducer carrier component 134 has a pyramidal or conical shape and is provided along sloped sides 136 with an array of electromechanical transducers 138. A water filled pad 140 may be provided along a bottom end of frame or carrier component 134. In FIG. 20, a frame or carrier 142 is ring shaped and has transducers 144.

Although the invention has been described in terms of particular embodiments and applications, one of ordinary skill in the art, in light of this teaching, can generate additional embodiments and modifications without departing from the spirit of or exceeding the scope of the claimed invention. For example, it is to be noted that the present invention.

Accordingly, it is to be understood that the drawings and descriptions herein are preferred by way of example to facilitate comprehension of the invention and should not be construed to limit the scope thereof.

What is claimed is:

1. A system for underground surveying, comprising:
   a plurality of substantially rigid frames;
   a plurality of acoustoelectric sensors for generating electrical signals encoding echo responses of underground surfaces, each of said frames carrying at least one of said sensors, said sensors being disposable in effective physical contact with underground structures upon an insertion of said frames through a ground surface;
   an acoustic energy generator disposable in effective physical contact with said underground structures;
   position determination componentry operatively connected to said sensors for determining locations of said sensors relative to one another;
   an electronic signal processor operatively connected to said sensors for analyzing said electrical signals in accordance with the determined locations of said sensors to determine surfaces of an object hidden underground and for generating a video signal encoding an image of said object; and
   a video monitor operatively connected to said processor for displaying the image of said object.

2. The system set forth in claim 1 wherein said acoustic energy generator is an electroacoustic transducer, further comprising an a-c current generator operatively connected to said electroacoustic transducer for energizing said electroacoustic transducer with an electrical signal of a pre-established ultrasonic frequency.

3. The system defined in claim 2 wherein said electroacoustic transducer is one of a plurality of electroacoustic transducers mounted to said frames, further comprising means operatively connected to said electroacoustic transducers for energizing said electroacoustic transducers in a predetermined sequence.

4. The system set forth in claim 1 wherein said processor includes an analyzer operatively connected to said sensors for determining a three-dimensional shape of said object by analyzing signals generated by said sensors in response to pressure waves produced at said object in response to pressure waves produced by said acoustic energy generator.

5. The system defined in claim 1 wherein said processor includes a view selector operatively connected to said video monitor for selecting said image from among a multiplicity of possible images of said object.

6. The system defined in claim 1, further comprising a filter stage operatively connected to said processor and said video monitor for eliminating a selected surface from said image.

7. The system defined in claim 1 wherein said sensors include a plurality of acoustoelectric transducers mounted to said frames, further comprising means operatively connected to said transducers for receiving signals from said acoustoelectric transducers in a predetermined sequence.

8. The system set forth in claim 1 wherein said position determination component includes an additional processor for analyzing additional electrical signals generated by said sensors in response to pressure waves transmitted underground directly from said acoustic energy generator to said sensors.

9. A method for underground surveying, comprising:
   disposing an array of acoustoelectric sensors in operative contact with a ground formation capable of transmitting pressure waves;
   after the disposing of said array of acoustoelectric sensors in operative contact with said ground formation, determining physical locations of said acoustoelectric sensors relative to each other;
   after the disposing of said array of acoustoelectric sensors in operative contact with said ground formation, generating a pressure wave in said ground formation;
   after the generating of said pressure wave, energizing said acoustoelectric sensors to generate a series of electrical signals encoding echo responses of underground surfaces to said pressure wave;
   automatically analyzing said electrical signals to generate a video signal encoding an image of said surfaces; and
   feeding said video signal to a video monitor to thereby display said surfaces on said monitor.

10. The method defined in claim 9 wherein said acoustoelectric sensors are mounted to a plurality of frame members, the disposing of said array of said acoustoelectric sensors including inserting said frame members through a ground surface and into said formation.

11. The method defined in claim 10 wherein said frame members each have an elongate dimension, the disposing of said array of acoustoelectric sensors including disposing said frame members so that the respective elongate dimensions extend approximately parallel to a gravity vector.

12. The method defined in claim 10 wherein said frame members each have an elongate dimension, the disposing of said array of acoustoelectric sensors including disposing said frame members so that the respective elongate dimensions extend at an acute angle relative to a gravity vector.

13. The method defined in claim 9 wherein said acoustoelectric sensors are mounted to a fluid filled container, the disposing of said array of said acoustoelectric sensors including disposing said container on said formation.

14. The method defined in claim 13 wherein said container has a wedge shape with a first wall and a second wall disposed at an angle relative to one another, said acoustoelectric sensors being fixed to said second wall, the disposing of said array of acoustoelectric sensors including disposing said first wall in contact with said formation and said second wall at said angle with respect to said first wall.

15. The method defined in claim 14 wherein the disposing of said container on said formation includes disposing said container in an arcuate configuration along an upper surface of said formation.

16. The method defined in claim 9, further comprising introducing a liquid into said formation.

17. The method defined in claim 9 wherein the disposing of said acoustoelectric sensors in operative contact with said formation includes deploying a carrier on said formation, said acoustoelectric sensors all being attached to said carrier.

18. The method defined in claim 9 wherein the energizing of said acoustoelectric sensors including receiving signals from said acoustoelectric sensors in a predetermined sequence.

19. The method set forth in claim 18 wherein determining the physical locations of said acoustoelectric sensors includes analyzing additional electrical signals generated by said acoustoelectric sensors in response to pressure waves transmitted through said formation directly from a pressure wave generator to said acoustoelectric sensors.

20. The method set forth in claim 9 wherein the analyzing of said electrical signals includes analyzing said electrical signals to determine a three-dimensional shape of an object defined by at least one of said surfaces.

21. The method defined in claim 20, further comprising selecting said image from among a multiplicity of possible images of said surfaces, further comprising subsequently selecting a different image from among said possible images and displaying said different image on said monitor.

22. The method defined in claim 20, further comprising eliminating at least a portion of a selected object from said image to thereby show on said monitor an image of an object behind the eliminated portion of said selected object.

23. The method defined in claim 9 wherein the generating of said pressure wave is accomplished by energizing an electroacoustic transducer which is one of a plurality of electroacoustic transducers disposed in a predetermined configuration, further comprising energizing said transducers in a predetermined sequence.

* * * * *